(No Model.)
G. H. FOWLER.
MACHINE FOR TRIMMING NUTS.
No. 298,742. Patented May 20, 1884.
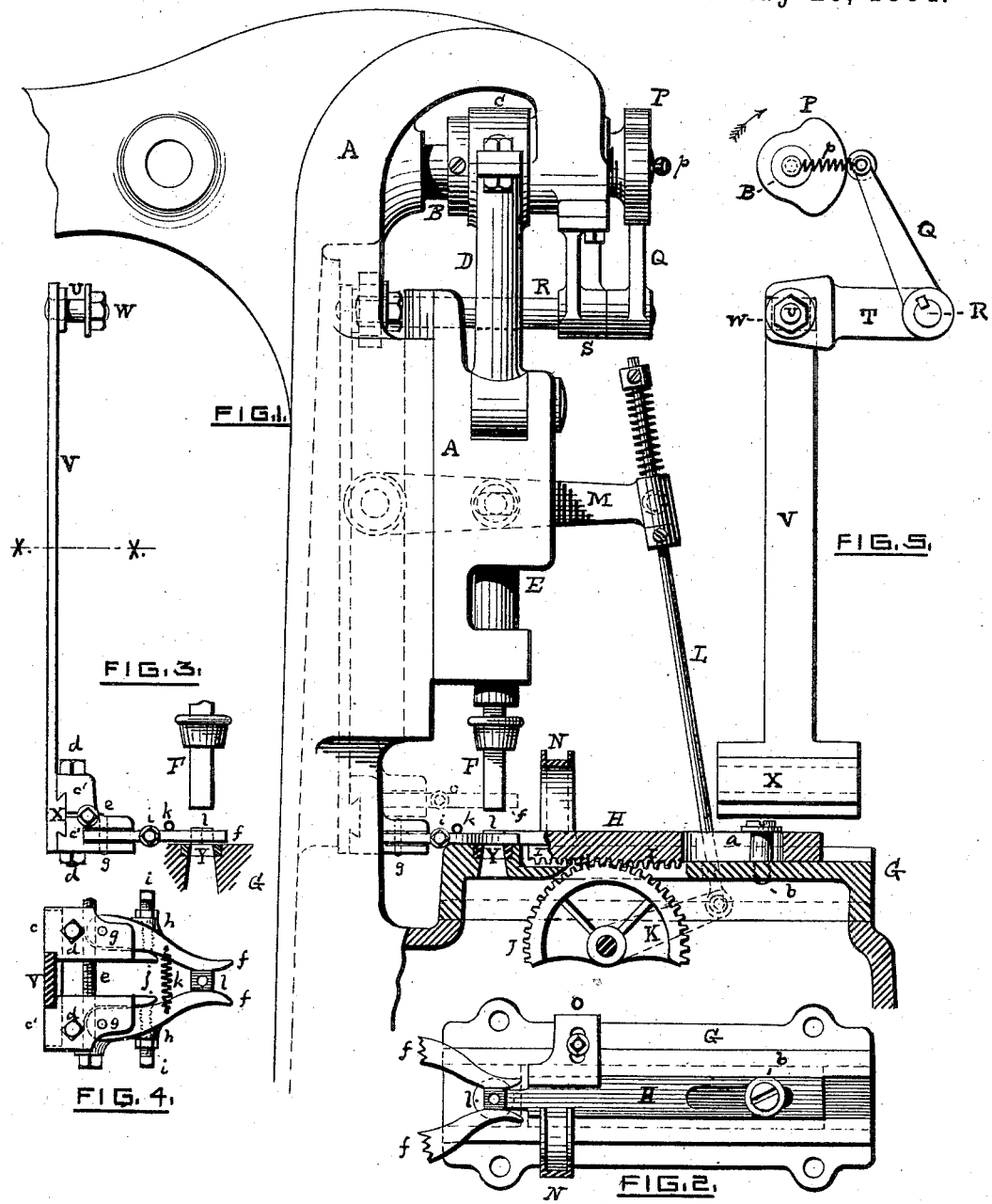
WITNESSES.
INVENTOR.

UNITED STATES PATENT OFFICE.

GEORGE H. FOWLER, OF PAWTUCKET, RHODE ISLAND.

MACHINE FOR TRIMMING NUTS.

SPECIFICATION forming part of Letters Patent No. 298,742, dated May 20, 1884.

Application filed October 12, 1883. (No model.)

*To all whom it may concern:*

Be it known that I, GEORGE H. FOWLER, of Pawtucket, in the county of Providence, in the State of Rhode Island, have invented a new and useful Improvement in Nut-Holding Devices in Machines for Trimming Nuts; and I declare the following to be a specification thereof, reference being had to the accompanying drawings.

Like letters indicate like parts.

Figure 1 is a side elevation of a press for trimming nuts having my improved nut-holding device. Fig. 2 is a top plan of my invention in relation to the feeding mechanism. Fig. 3 is a side elevation of my invention. Fig. 4 is a top plan of the same, partially in transverse section on the line $x$ of Fig 3. Fig. 5 is a front elevation of the lift-bar and the mechanism by which it is operated.

My invention relates to presses used in the trimming of nuts, and is a nut-holding device consisting of a pair of fingers mounted and pivoted upon blocks, and adjustable therewith and thereon by screws, and closed to a regulated distance by an interposed spring, said nut-holding device being fastened to a lift-bar, which has a vertical reciprocating motion communicated to it by a bell-crank lever which is vibrated by a cam of the main shaft of the press, the whole being so adjusted in its movements with relation to the nut-feeding mechanism as to receive and hold fast the nut until it is engaged in the die by the plunger, and then to rise and strip the plunger of any chips or scales which may have adhered thereto in the operation of trimming.

In the drawings a nut-trimming press of ordinary construction is shown, the frame of which is designated as A. It has a main shaft, B, with an eccentric, C, thereon reciprocating a pitman, D, which carries vertically a socket-bar, E, to which a plunger, F, is attached in the usual manner. Upon the bed G of the press is a nut-feeder, H, upon whose under side is a rack, I, which is moved horizontally back and forth by a cogged sector or pinion, J, receiving an oscillating motion upon its axis by its connection with the fixed arm K, pivoted rod L, and lever M, the latter being actuated vertically by its connection with the bar E, as shown in Fig. 1. The nut-feeder H is slotted longitudinally, as shown at $a$, and is confined to a horizontal plane in its movement by a set-screw, $b$, passing through said slot. A trough, N, allows the nuts to slide therein by their own weight down upon a shelf on the frame, G, and against a guide-plate, O, in which position the forward end of the feeder H comes against the nut and carries it forward to a position centering with the die which is to trim it.

Thus far I have described a nut-trimming press of ordinary form and operation. To this I add a nut-holding device, the construction and use of which I will now specify.

Upon the front end of the main shaft B is a cam, P, revolving therewith, the form of which is shown in Fig. 5. The cam P vibrates the lever-arm Q, splined to a shaft, R, at one end, said shaft being sustained and moving in a bearing, S, and carrying at its inner or opposite end the fixed arm T. A spring, $p$, connecting a knob of the arm Q to a knob of the shaft B, keeps the arm Q in following contact with said cam. The arm T is slotted to receive the pin or lug U of a lift-bar, V. A nut, W, confines the pin U within the slot of the arm T. At its lower extremity the lift-bar V is widened, and is furnished with a dovetailed portion, X. By means of this dovetail two blocks, $c\,c'$, are securely fastened to the lift-bar V by being clamped thereon by the screws $d\,d$. Said blocks $c\,c'$ are adjustable transversely on the dovetail X by the screw-bolt $e$, having at one end a right-hand screw-thread and at the other a left-hand screw-thread, to spread apart or draw together said blocks, as desired. A pair of fingers, $f\,f$, are pivoted, respectively, to the blocks $c\,c'$, within slots thereof, as shown at $g$, and have bosses $h\,h$, through which adjusting-screws $i\,i$ pass, whose inner ends, striking against the forward extensions, $j\,j$, of said blocks, limit adjustably the approach of the fingers $f\,f$ to each other, while the spiral spring $k$ holds said fingers in said position normally, although permitting them to spread apart when the nut $l$ is forced between them, as hereinafter described.

Having thus described the several parts of my invention, I will now show its use and operation.

A nut, $l$, slides down the trough N, against the guide O, where it is struck by the advancing end of the feeder H and carried forward to the die Y. The nut is pushed by the feeder H into the flaring ends of the fingers $ff$, which are spread apart thereby sufficiently to receive said nut and by the force of the spring $k$ grip it firmly. In the meanwhile the plunger F, descending, strikes the top of the nut $l$, forcing it into and through the die Y, the feeder H at the same time receding from the nut $l$ by the operation of its connected mechanism, actuated by the descending bar E. As soon as the plunger F has engaged the top surface of the nut $l$, the fingers $ff$, with their connected parts, rise upward rapidly, because of the sudden lifting of the bar V by the vibration of the arms and shaft T Q R, resulting from the turning of the cam P. The fingers $ff$ remain in their elevated position, as shown in dotted lines in Fig. 1, until the plunger F describes its return or upward motion, when the turning of the cam P, then reaching its shorter radius in relation to the arm Q, carries the bar V and its connected parts suddenly downward, and the plunger F, thus clearing the fingers $ff$, which have closed upon it in its descent, now is stripped (in its ascent) of any chips or scales which may have adhered to it in the process of forcing or trimming the nut through the die. The fingers $ff$ are then in the position shown in solid lines in Fig. 1, ready to receive the next nut, which is fed to it by the now advancing feeder H.

In trimming a nut, its edges are cut square by the die through which it is forced, and the scales and waste material thus cut off are apt to cling to the plunger, and thereby interfere with its proper working; hence it is necessary at each operation that the plunger should be cleared of these chips and scales by the stripping action of these vertically-moving fingers. While the fingers are raised above the die, the operator brushes away this waste stuff from the surface of the die, in readiness for the next trimming operation. If the fingers were not thus temporarily lifted above the die, such waste could not be removed therefrom, and the die would become clogged. As soon as said stripping and brushing have been accomplished, the descent of the bar V brings the fingers again into position upon the die to receive the next nut fed to it, and to hold it, as already described, during the treatment.

In this operation of stripping it will be observed that the fingers are lifted before the plunger begins to rise, and, while thus elevated, scrape the plunger during the ascent. It will also be observed that the plunger is stripped or scraped only on two opposite sides. This is all that is necessary, for in practice it is found that the chips, on whichever side, extend beyond the punch sufficiently to be struck by the fingers as it passes between them. Any small chips which are not large enough to project so far as to be reached by the fingers will not seriously interfere with the work.

The purpose of the right-and-left threaded screw-bolt $e$ is to adjust transversely the blocks $c\ c'$, which carry the fingers $f\ f$, so that the gripping portion of said fingers may be parallel to receive the opposite edges of the nut, thereby adapting the fingers to hold squarely and firmly a nut of whatever size. But for this adjustment a large nut would be held only by its corners, and thus be insecure until actually forced into the die by the plunger. The blocks $c\ c'$ are each slotted crosswise in the rear, as shown in Fig. 3, to enable them the better to be clamped upon the dovetail X of the lift-bar V by the bolts $d$.

I claim as a novel and useful invention and desire to secure by Letters Patent—

1. In a nut-trimming machine, the combination of the pivoted fingers $ff$, the blocks $c\ c'$, and spring $k$, arranged to receive from a nut-feeder, H, a nut, and to hold the same centering with the die, substantially as specified.

2. The combination of the blocks $c\ c'$, having extensions $j$, the pivoted fingers $ff$, spring $k$, and adjusting-screws $e\ i\ i$, substantially as shown.

3. The cam P, shafts B R, arms Q T, pin U, and lift-bar V, in combination with a nut-holding device, substantially as and for the purpose specified.

4. The blocks $c\ c'$, the fingers $ff$, mounted, sprung, and adjustable thereon, as described, and having a vertical reciprocating movement by the lift-bar V, actuated by the levers Q T, shafts B R, and cam P, in combination with a reciprocating plunger, F, operated by the shaft B, eccentric C, pitman D, and socket-bar E, the vertical movements of said fingers $ff$ and plunger F being so related in correspondence as to hold a nut centering on the die Y until it is engaged by the plunger F, and then to strip the plunger of waste, substantially as specified.

5. The blocks $c\ c'$, the fingers $ff$, mounted, sprung, and adjustable on said blocks, as shown, and having the vertical reciprocating movement by the mechanism described, in combination with the nut-feeding device, consisting of the feeder H, having the slot $a$ and set-screw $b$, the frame G, the pinion J, arm K, rod L, and lever M, actuated by the main shaft B through its intermediate connections, substantially as and for the purpose specified.

6. The lift-bar V, having a dovetailed projection, X, in combination with the blocks $c\ c'$, adjustable by the screws $d\ d\ e$, and provided with nut-holding fingers, substantially as described.

GEORGE H. FOWLER.

Witnesses:
WILLIAM B. W. HALLETT,
WARREN R. PERCE.